United States Patent
Peng

(10) Patent No.: US 7,272,915 B2
(45) Date of Patent: *Sep. 25, 2007

(54) SHINGLE AND MAT TENSILE STRENGTH WITH UREA FORMALDEHYDE RESIN MODIFIER

(75) Inventor: Qinyun Peng, Yorktown Heights, NY (US)

(73) Assignee: Building Materials Investment Corporation, Wilmington, DE (US)

( * ) Notice: Subject to any disclaimer, the term of this patent is extended or adjusted under 35 U.S.C. 154(b) by 250 days.

This patent is subject to a terminal disclaimer.

(21) Appl. No.: 10/841,054

(22) Filed: May 7, 2004

(65) Prior Publication Data

US 2005/0249918 A1    Nov. 10, 2005

(51) Int. Cl.
*D21F 11/00* (2006.01)
*B32B 27/12* (2006.01)

(52) U.S. Cl. .......................... 52/514; 52/514.5; 52/518; 52/534; 52/537; 428/36.1; 428/40.3; 428/489; 428/505; 428/524; 442/157; 442/160; 442/170; 442/171; 442/176; 442/178; 442/180; 442/301; 162/157.5; 162/157.1; 162/157.2; 162/157.3; 162/157.4

(58) Field of Classification Search ...................... None
See application file for complete search history.

(56) References Cited

U.S. PATENT DOCUMENTS

| 3,837,767 | A | * | 9/1974 | Aller ...................... 417/423.14 |
| 3,919,356 | A |   | 11/1975 | Boyer |
| 4,135,029 | A |   | 1/1979 | Pfeffer |
| 4,430,158 | A |   | 2/1984 | Jackey et al. |
| 4,513,045 | A |   | 4/1985 | Bondoc et al. |
| 4,542,068 | A |   | 9/1985 | Whichard |
| 4,543,158 | A |   | 9/1985 | Bondoc et al. |
| 4,897,118 | A | * | 1/1990 | Ferrier et al. .............. 106/1.11 |
| 5,095,055 | A |   | 3/1992 | Moran |
| 5,804,313 | A | * | 9/1998 | Schell ........................ 428/391 |
| 5,865,003 | A |   | 2/1999 | Klett et al. |
| 6,030,559 | A |   | 2/2000 | Barry et al. |
| 6,544,911 | B2 | * | 4/2003 | Peng et al. .................. 442/157 |
| 6,817,152 | B2 | * | 11/2004 | Peng et al. .................... 52/514 |
| 6,993,876 | B1 | * | 2/2006 | Peng et al. .................... 52/514 |
| 2003/0054714 | A1 | * | 3/2003 | Peng et al. .................... 442/71 |

* cited by examiner

*Primary Examiner*—Kevin M. Bernatz
(74) *Attorney, Agent, or Firm*—William J. Davis; Walter Katz

(57) ABSTRACT

A composite sheet, and a process of making the same, including cured modified urea formaldehyde reinforced by glass fibers. The modifier is an acrylonitrile-butadiene-styrene copolymer. A roofing shingle, formed by coating the composite sheet with filled asphalt, represents a major application of the composite sheet.

19 Claims, No Drawings

SHINGLE AND MAT TENSILE STRENGTH WITH UREA FORMALDEHYDE RESIN MODIFIER

BACKGROUND OF THE DISCLOSURE

1. Field of the Invention

The present invention is directed to a composite sheet material, useful as a component for asphalt shingles, which provides improved tensile strength.

2. Description of the Prior Art

High strength, uniform thin sheets or mats of glass fibers have become very important in the building materials industry. Probably the best example of the use of this type of material is in roofing shingles. The art is replete with descriptions of glass fiber mats and methods of making those mats having improved strength characteristics formed of glass fibers and made commercially by a wet-laid process.

For example, an interesting description of the development of this process is set forth in U.S. Pat. No. 4,135,029. Glass fiber mats made by the wet-laid process are formed by combining glass fibers held together by a binder material. Although binders useful in this application include urea-formaldehyde resins, phenolic resins, bone glue, polyvinyl alcohols, acrylic resins and polyvinyl acetates, urea-formaldehyde resins are preferred due to their low cost.

Conventionally, wet process glass fiber mats are made from glass fiber held together by a binder, which may comprise a thermosetting polymer system. Typically, the binder is applied in a liquid form and dispersed onto the glass fibers by a curtain type applicator. Conventional wet processes strive to produce a uniform coating of binder on the glass fibers. After the binder and glass fibers have been dried and cured, the glass fiber mat is then cut as desired.

A major problem in the manufacture and use of glass fiber mats resides in inadequate tensile strength. Inadequate tensile strength causes interruption in roofing manufacture. Equally important, inadequate tensile strength reduces the ability of the finished roofing to resist stresses in service on a roof.

The prior art has addressed this problem in the manufacture and use of glass fiber mats. For example, U.S. Pat. No. 4,430,158 provides improved tensile strength to a sized glass fiber mat by adding an anionic surfactant which contains hydrophobic segments containing from 8 to 30 carbon atoms and anionic segments which may be carboxy, sulfate ester, phosphate ester, sulfonic acid and phosphonic acid.

A further means of increasing the tensile strength of glass fiber mats, disclosed in U.S. Pat. No. 5,865,003, involves the application of high and low concentrations of a binder. A certain application is utilized to apply the binder to the glass mat, where the excess binder is removed using a vacuum.

Yet a further means of improving tensile strength of glass fiber mats employed as roofing shingles is taught in U.S. Pat. No. 4,542,068 which discloses a method of making a glass fiber mat in which an alkoxylated alkylamine having the formula

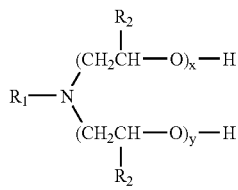

is added to a binder composition which comprises urea-formaldehyde and in which glass fibers are dispersed in a wet-laid process.

The prior art includes several disclosures that mention acrylonitrile-butadiene-styrene for use in applications which are of interest in relation to the present invention.

U.S. Pat. No. 5,095,055 describes the improvement of storage stability of acid treated polymer modified asphalts. Although the disclosure applies only to asphalts that are modified to enhance rheological properties, the '055 patent recites that such stability is important in applications that include roofing. The modifying agent is a branched polymer. Although a multiplicity of branched thermoplastic polymers are recited in the '055 patent, one of them is a copolymer of acrylonitrile-butadiene-styrene. It is emphasized that no disclosure of use of this polymer as a modifier of glass fiber mat binders is made.

U.S. Pat. Nos. 4,513,045 and 4,543,158 disclose a sheet type felt which primarily comprise cellulosic fibers but also include glass fibers, a binder and asphalt. The felt is recited to be useful as siding, roofing underlayment or as a facer for foamed insulation boards. Of interest is the inclusion of an acrylonitrile-butadiene-styrene copolymer, among many other foamable polymers, in the formation of rigid foamed insulation boards.

U.S. Pat. No. 3,919,356 concerns flame retardant polymeric compositions. In that disclosure acrylonitrile-butadiene-styrene resins, among several others, are employed with a class of compounds, referred in the '356 patent as CNB. Among the materials rendered flame retardant by the addition of the flame retardant compositions of the '356 patent is asphalt.

U.S. Pat. No. 6,030,559 sets forth a method of continuously manufacturing a plastic foam, which may be an acrylonitrile-butadiene-styrene copolymer, reinforced by a fibrous material.

The above remarks establishes the need in the art for a new composite glass fiber mat sheet having improved tensile strength as well improved tensile strength products which utilize those glass fiber mat sheets, such as roofing products, including shingles and roll roofing.

BRIEF SUMMARY OF THE INVENTION

It has now been found that tensile strength of glass fiber mats may be increased in accordance with the usual method of making such mats in which a modifier is added to the commonly employed glass fiber mat binder.

In accordance with the present invention, a composite sheet having improved tensile strength is provided. The composite sheet includes glass fibers bound together by a cured urea formaldehyde binder wherein the binder, prior to curing, is modified with an acrylonitrile-butadiene-styrene ABS resin.

In further accordance with the present invention, a roofing shingle having improved tensile strength is provided by coating the aforementioned composite sheet, having improved tensile strength, with asphalt and processing the coated asphalt in accordance with well known methods to produce roofing shingles or roll roofing.

DETAILED DESCRIPTION

The composite sheet of the present invention includes a plurality of randomly dispersed glass fibers that are bound with a resin binder comprising urea formaldehyde modified with ABS. An example of a commercially available ABS heat reactive terpolymer is Hycar® G-17, manufactured by B.F. Goodrich Chemical Co. Hycar® G-17 acrylonitrile-butadiene-styrene copolymer (ABS) includes about 50 weight % solids. In a preferred embodiment, the ABS modifier is present in a concentration in the range of between about 0.5% and about 20%, said percentages being by weight, based on the total weight of the resin binder solids.

The composite sheet of the present invention is prepared by randomly dispersing glass fibers in an aqueous dispersant, preferably water. The dispersion is then strained and the wet glass fiber mat is contacted with a urea formaldehyde binder. The urea formaldehyde binder is modified with the aforementioned ABS modifier in a preferred concentration in the range of between about 0.5% and about 20% by weight, based on the total weight of the resin binder solids. More preferably the modifier concentration is in the range of between about 0.75% and about 15% by weight. Still more preferably, the ABS modifier concentration is in the range of between about 1% and about 10% by weight.

The urea formaldehyde-laden glass mat is cured by heating. In a preferred embodiment curing is effected at atmospheric pressure in an air oven maintained at a temperature in the range of between about 250° C. and about 325° C. for a period of about 5 to about 20 seconds. More preferably, curing occurs at a temperature in the range of between about 270° C. and about 300° C. for a period of about 2 to about 15 seconds.

The resultant composite sheet, a urea formaldehyde glass fiber reinforced mat, is utilized in a plurality of applications, which especially focus on building construction uses. Of these uses, probably the most important is as a roof covering product. In this application, the use of the composite sheet of the present invention in the manufacture of roofing shingles and roll roofing is particularly significant.

When employed in the manufacture of roofing materials, the composite sheet is coated with asphalt. Asphalt is a substance commonly left as a residue after evaporating or otherwise processing crude oil or petroleum. Asphalt is usually further refined to conform to various roofing grade specifications when used in a roofing shingle or roll roofing. Optionally, the asphalt may be admixed with a fine material filler such as limestone, talc, mica or sand. Other additives and fillers, known in the art, may also be employed.

The following examples are given to illustrate the scope of the present invention. Because these examples are given for illustrative purposes only, the invention should not be deemed limited thereto.

EXAMPLE 1

Glass fibers were randomly dispersed in water to form a dispersion. The dispersion was then strained and the resultant wet glass fibers were disposed on a moving screen. The wet glass fibers on the moving screen were contacted with a urea formaldehyde resin dispersion which included 1% by weight, based on the total weight of the resin binder solids, of ABS copolymer, Hycar® G-17.

The urea formaldehyde coated glass fibers were heated in an air oven at 300° C. at atmospheric pressure for 13 seconds. The resultant product, a urea formaldehyde cured glass fiber mat, was thereupon coated with an unfilled asphalt coating.

Eight samples of the coated product were tested for tensile strength. The tensile strength was obtained by employing a constant rate of elongation machine. That machine, a product of the Instron Corporation, processed test specimens 1" wide by 4" long. The test was conducted at a constant rate of 1-inch elongation per minute. The tensile strength reported was the statistical average of the results obtained for the eight samples.

It is emphasized that the coated products tested were similar to commercial roofing shingles but for the absence of granules on one asphalt coated side and sand on the other. In addition, the asphalt coated sample thickness on both sides were approximately the same. Commercial shingles, although asphalt coated on both sides, employ a much greater asphalt coating thickness on one side than the other.

The results of this test are summarized in Table 1.

This test is compared to those conducted on samples prepared under the same conditions but for the replacement of the ABS copolymer with a conventional urea formaldhyde modifier styrene butadiene rubber (SBR). The results of this test are summarized in Table 2.

EXAMPLE 2

Example 1 was repeated but for the concentration of the ABS modifier employed in the manufacture of the composite sheets of urea formaldehyde reinforced by glass fibers. In this example the urea formaldehyde was modified by 10% by weight, based on the total weight of the resin binder solids, of Hycar® G-17. The percentage was by weight based on the weight of the urea formaldehyde binder.

The tensile strength of the ply sheets is reported in Table 1.

This test is compared to those conducted on samples prepared under the same conditions but for the replacement of the ABS copolymer with a conventional urea formaldehyde modifier styrene butadiene rubber (SBR). The results of this test are summarized in Table 2.

EXAMPLE 3

Example 2 was duplicated but for the concentration of the ABS Hycar® G-17 modifier. In this example the ABS was present in a concentration of 20% by weight, based on the weight of the urea formaldehyde binder.

The results of Example 3 are reported in the Table 1.

These tests are compared to those conducted on samples prepared under the same conditions but for the replacement of the ABS copolymer with a conventional urea formaldehyde modified with styrene butadiene rubber (SBR) latex. The results of this test are summarized in Table 2.

TABLE 1

| Example No. | ABS Modifier, % | Tensile Strength, $lbf/in^2$ ± Standard Deviation, $lbf/in^2$ |
| --- | --- | --- |
| 1 | 1 | 2054 ± 305 |
| 2 | 10 | 2596 ± 349 |
| 3 | 20 | 2636 ± 321 |

TABLE 2

| Example No. | SBR Modifier, % | Tensile Strength, ± Standard Deviation |
| --- | --- | --- |
| 1 | 1 | 1720 + 265 |
| 2 | 10 | 2444 + 226 |
| 3 | 20 | 2601 + 399 |

The above embodiments and examples are provided to illustrate the scope and spirit of the present application. These embodiments and examples will make apparent, to those skilled in the art, other embodiments and examples. These other embodiment and examples are within the contemplation of the present application. Therefore, the present application should be limited only by the appended claims.

What is claimed is:

1. A composite sheet material comprising a cured urea formaldehyde mat reinforced by glass fibers wherein said urea formaldehyde is modified by an acrylonitrile-butadiene-styrene copolymer prior to curing.

2. A composite sheet in accordance with claim 1 wherein said acrylonitrile-butadiene-styrene copolymer is present in a concentration of between about 0.5% and about 20%, said percentages being by weight, based on total weight of the resin binder solids including the urea formaldehyde.

3. A composite sheet in accordance with claim 2 wherein said acrylonitrile-butadiene-styrene copolymer is present in a concentration of between about 0.75% and about 15%.

4. A composite sheet in accordance with claim 3 wherein said acrylonitrile-butadiene-styrene copolymer is present in a concentration of between about 1% and about 10%.

5. A roof covering product comprising said composite sheet of claim 1 coated with filled asphalt.

6. A roof covering product comprising said composite sheet of claim 2 coated with filled asphalt.

7. A roof covering product comprising said composite sheet of claim 3 coated with filled asphalt.

8. A roof covering product comprising said composite sheet of claim 4 coated with filled asphalt.

9. A process of making a composite sheet comprising the steps of:
dispersing glass fibers in an aqueous dispersant;
screening said glass fiber dispersion whereby said dispersed glass fibers form a mat;
contacting said mat with a urea formaldehyde resin modified with an acrylonitrile-butadiene-styrene copolymer; and
curing said modified urea formaldehyde resin.

10. A process in accordance with claim 9 wherein said acrylonitrile-butadiene-styrene copolymer is present in a concentration of between about 0.5% and about 20%, said percentages being by weight, based on the weight of the urea formaldehyde resin.

11. A process in accordance with claim 10 wherein said acrylonitrile-butadiene-styrene copolymer is present in a concentration of between about 0.75% and about 15%.

12. A process in accordance with claim 11 wherein said acrylonitrile-butadiene-styrene copolymer is present in a concentration of between about 1% and about 10%.

13. A process of making a roofing shingle comprising the steps of:
dispersing glass fibers in an aqueous dispersant;
screening said glass fiber dispersion whereby said dispersed glass fibers form a mat;
contacting said mat with a urea formaldehyde resin modified with an acrylonitrile-butadiene-styrene copolymer;
curing said modified urea formaldehyde resin, whereby a cured urea formaldehyde mat reinforced with glass fibers is formed; and
coating said cured mat with filled asphalt.

14. A process in accordance with claim 13 wherein said acrylonitrile-butadiene-styrene copolymer is present in a concentration in the range of between 5 about 0.5% and about 20%, said percentages being by weight, based on the weight of said urea formaldehyde resin.

15. A process in accordance with claim 14 wherein said acrylonitrile-butadiene-styrene copolymer is present in a concentration in the range of between about 0.75% and about 15%.

16. A process in accordance with claim 15 wherein said acrylonitrile-butadiene-styrene copolymer is present in a concentration in the range of between about 1% and about 10%.

17. A process in accordance with claim 13 wherein curing is done by heating.

18. A process in accordance with claim 17 wherein curing is effected at atmospheric pressure at a temperature range of 250° C. to 325° C.

19. A process in accordance with claim 18 wherein curing is effected at atmospheric pressure at a temperature range of 270° C. to 300° C. for a period of 2 to 15 seconds.

* * * * *